US009513667B2

(12) United States Patent
Pais et al.

(10) Patent No.: US 9,513,667 B2
(45) Date of Patent: Dec. 6, 2016

(54) METHODS, APPARATUSES, AND SYSTEMS FOR RADIO FREQUENCY MANAGEMENT BETWEEN DEVICES

(75) Inventors: Martin R. Pais, North Barrington, IL (US); Istvan J. Szini, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 623 days.

(21) Appl. No.: 13/482,341

(22) Filed: May 29, 2012

(65) Prior Publication Data
US 2013/0322568 A1    Dec. 5, 2013

(51) Int. Cl.
*H04L 12/28*  (2006.01)
*G06F 1/16*  (2006.01)
*H01Q 1/22*  (2006.01)
*H04M 1/725*  (2006.01)

(52) U.S. Cl.
CPC ........... *G06F 1/1632* (2013.01); *G06F 1/1686* (2013.01); *G06F 1/1698* (2013.01); *H01Q 1/2266* (2013.01); *H04M 1/72527* (2013.01)

(58) Field of Classification Search
CPC ..................................................... H04L 29/06
USPC .................................. 370/419; 710/300–304
See application file for complete search history.

(56) References Cited

U.S. PATENT DOCUMENTS

| | | |
|---|---|---|
| 5,739,790 A | 4/1998 | Green, Jr. |
| 5,768,163 A | 6/1998 | Smith |
| 6,091,368 A | 7/2000 | Mitchell et al. |
| 6,118,653 A * | 9/2000 | Kim ...................... G06F 1/1616 312/223.1 |
| 6,313,987 B1 | 11/2001 | O'Connor et al. |
| 6,347,035 B1 | 2/2002 | Hamano et al. |
| 6,445,580 B1 | 9/2002 | Cohen et al. |
| 6,717,798 B2 | 4/2004 | Bell et al. |
| 6,717,799 B2 | 4/2004 | Hamano et al. |
| 6,778,383 B2 | 8/2004 | Ho |
| 6,795,311 B2 | 9/2004 | Pokharna et al. |

(Continued)

FOREIGN PATENT DOCUMENTS

| | | |
|---|---|---|
| EP | 2197185 A2 | 6/2010 |
| EP | 2203012 A1 | 6/2010 |
| WO | 2009145922 A1 | 12/2009 |

OTHER PUBLICATIONS

Pascariu et al., "Next Generation Electronics Packaging Utilizing Flip Chip Technology" 2003 IEEE/CPMT/SEMI Int'l Electronics Manufacturing Technology Symposium, pp. 423-426.

(Continued)

*Primary Examiner* — Christopher R Crompton
(74) *Attorney, Agent, or Firm* — Faegre Baker Daniels LLP

(57) ABSTRACT

A peripheral electronic device (106) can be equipped with a coupler, which in one embodiment is a mechanical coupler (136). A radio-frequency interface (108) allows a radio-frequency transceiver (110) of one electronic device to take advantage of one or more antennas (1101,1102,1103,1104) disposed within the peripheral electronic device (106). For example, the radio-frequency interface (108) can increase the matrix channel order by making the at least some additional MIMO antennas available for usage by the radio-frequency transceiver (110). The mechanical coupler can be configured to allow a camera or display of an inserted device to add image data functionality as well.

16 Claims, 10 Drawing Sheets

(56) References Cited

U.S. PATENT DOCUMENTS

| | | |
|---|---|---|
| 6,798,647 B2 | 9/2004 | Dickie |
| 6,920,344 B2 | 7/2005 | Jang |
| 7,035,106 B2 | 4/2006 | Youm et al. |
| 7,242,574 B2 | 7/2007 | Sullivan |
| 7,251,133 B2 | 7/2007 | Wallace |
| 7,277,282 B2 | 10/2007 | Tate |
| 7,336,228 B2 | 2/2008 | Lu et al. |
| 7,490,656 B2 | 2/2009 | Senyk et al. |
| 7,684,185 B2 | 3/2010 | Farrugia |
| 7,733,635 B2 | 6/2010 | Sullivan |
| 7,764,506 B2 | 7/2010 | Sullivan |
| 7,793,027 B2 | 9/2010 | Mok et al. |
| 7,855,529 B2 | 12/2010 | Liu |
| 7,872,864 B2 | 1/2011 | Mongia et al. |
| 8,049,311 B2 | 11/2011 | Lim et al. |
| 8,089,753 B2 | 1/2012 | Dotson |
| 8,294,666 B2 | 10/2012 | Tabasso et al. |
| 8,976,513 B2 | 3/2015 | Sullivan |
| 2002/0027613 A1* | 3/2002 | Tajima ............... G06F 1/1601 348/552 |
| 2002/0122298 A1 | 9/2002 | Cohen et al. |
| 2002/0158987 A1* | 10/2002 | Shimizu ............. G03B 17/48 348/364 |
| 2003/0198009 A1* | 10/2003 | Homer ............... G06F 1/1616 361/679.27 |
| 2004/0135738 A1 | 7/2004 | Kim et al. |
| 2005/0157458 A1 | 7/2005 | Yin et al. |
| 2006/0236014 A1 | 10/2006 | Yin et al. |
| 2008/0111746 A1 | 5/2008 | Levy et al. |
| 2008/0310108 A1 | 12/2008 | Eriksson et al. |
| 2008/0318584 A1* | 12/2008 | Manholm et al. ............ 455/446 |
| 2010/0234071 A1 | 9/2010 | Shabtay et al. |
| 2011/0102348 A1* | 5/2011 | Moran et al. ................. 345/173 |
| 2011/0167180 A1 | 7/2011 | Towell et al. |
| 2011/0281520 A1 | 11/2011 | Lin et al. |
| 2012/0054401 A1* | 3/2012 | Cheng ............................ 710/304 |
| 2012/0300378 A1 | 11/2012 | Tsai et al. |
| 2013/0308266 A1 | 11/2013 | Sullivan |
| 2013/0322568 A1 | 12/2013 | Pais et al. |
| 2014/0092564 A1 | 4/2014 | Chuang et al. |
| 2014/0118960 A1 | 5/2014 | Cheng et al. |
| 2014/0270303 A1 | 9/2014 | Cheng et al. |
| 2014/0355206 A1 | 12/2014 | Sullivan |
| 2015/0237238 A1* | 8/2015 | Duffy .................. H04N 5/2251 348/375 |

OTHER PUBLICATIONS

Patent Cooperation Treaty, International Search Report and Written Opinion of the International Searching Authority for International Application No. PCT/US2013/040249, Oct. 30, 2013, 19 pages.

\* cited by examiner

METHODS, APPARATUSES, AND SYSTEMS FOR RADIO FREQUENCY MANAGEMENT BETWEEN DEVICES

BACKGROUND

Technical Field

This invention relates generally to electronic devices, and more particularly to interaction management between devices.

Background Art

Communication technology is constantly evolving. For instance, there was a time when the only way to make a telephone call was across a copper wire with the assistance of a human operator. Today, by contrast, people are able to call others around the world with a variety of communication devices, including cellular telephones, satellite telephones, and network-based communication systems such as voice over Internet protocol phone devices that function with the assistance of a computer or other specialized hardware. In addition to these voice-based channels, people may communicate via electronic mail, text messaging, videoconferences, and multimedia messaging as well.

With the advent of new communication protocols and technologies, device manufacturers are continually designing more features into their handsets. At the same time, consumers are continually demanding smaller and sleeker devices. Additional features require additional space within a device and more powerful processors and control circuits. The desire for smaller devices demands the opposite—less space, smaller energy supplies, and more advanced processors and control circuits.

It would be advantageous to have methods, apparatuses, and systems that enabled enhanced feature sets without excessively increasing the overall component size.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
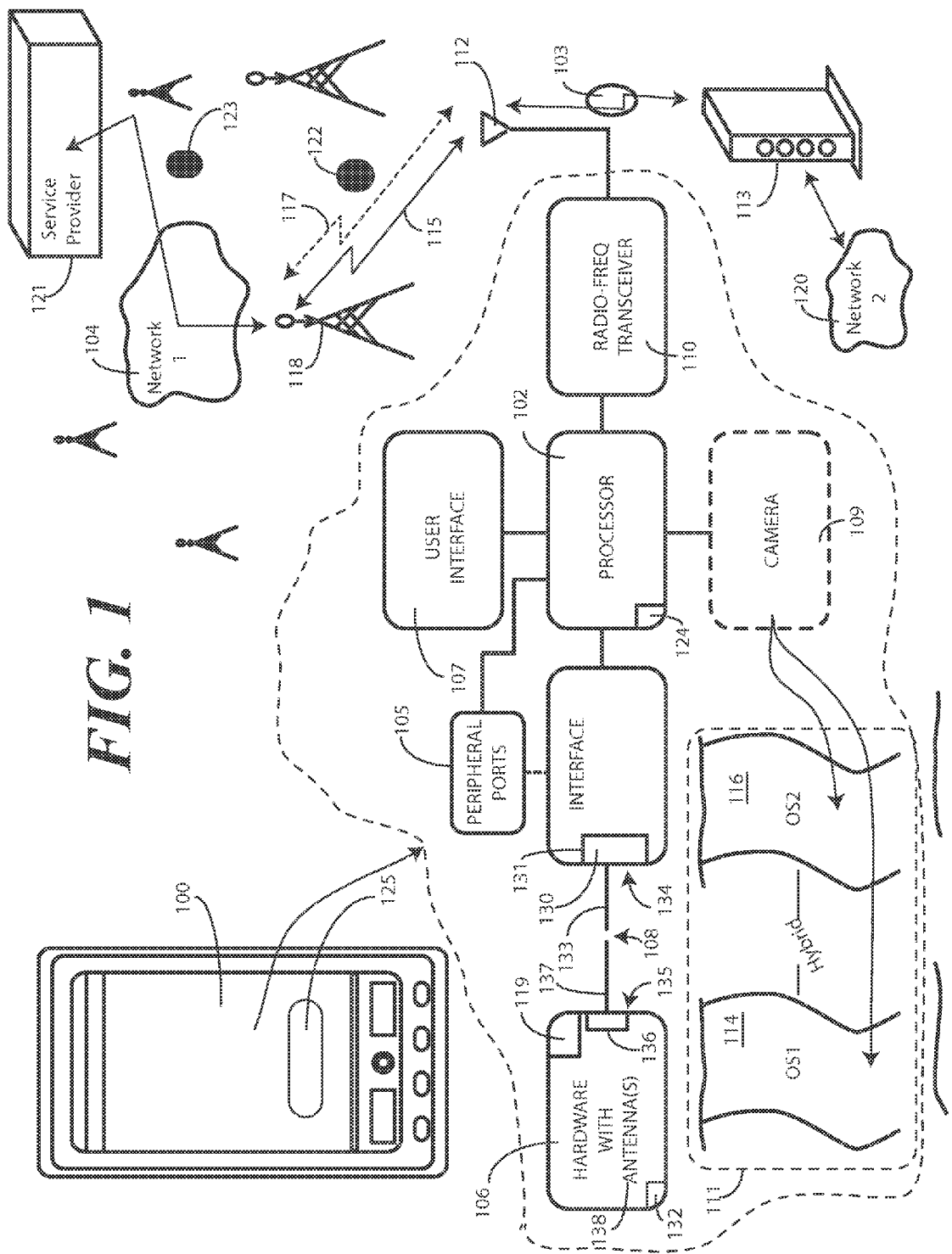
FIG. 1 illustrates one explanatory portable electronic device configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to image data and radio frequency management practices between a portable electronic device and another electronic device, with those practices offering an enhanced overall feature set to a user without requiring increased volume in the portable electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of image data transfer, data communications, and radio frequency functions that occur between electronic devices illustrated herein. The non-processor circuits may include, but are not limited to, a radio receiver, a radio transmitter, signal drivers, clock circuits, power source circuits, and user input devices. As such, these functions may be interpreted as steps of a method to perform feature and radio frequency management activities between two or more devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide methods, apparatuses, and systems for image data and radio frequency feature/performance management between devices when those devices are coupled together. For example, in one embodiment, an electronic device is configured as a "peripheral" device for a portable electronic device. When the two devices are coupled together, the portable electronic device can provide primary computational functionality for the system in one embodiment. In other embodiments, a peripheral device could have a processor configured with computational capabilities, with the portable electronic device providing radio-frequency capabilities for the system. In yet another embodiment, both the peripheral and portable electronic device could have computational resources. Combining the two allows the system to have multi-processor power.

The portable electronic device can operate in a first mode when alone. However, when operating in tandem with the peripheral device, additional features and functionality is possible without making the portable electronic device any larger due to the image data and radio frequency management functionality offered by embodiments of the present invention. In addition to "dual operating environment" applications, which will be explained in more detail below, embodiments of the present invention can be used for any type of system where multiple electronic devices are coupled together to provide a common system application.

In one embodiment, an electronic device is configured as a peripheral device for a portable electronic device. The peripheral device is configured with a mechanical coupler configured to receive the portable electronic device. In one embodiment, the mechanical coupler is disposed along an external surface of the peripheral device. When the portable electronic device is inserted into the mechanical coupler a major face of the portable electronic device is configured to physically abut the external surface of the peripheral device. When the portable electronic device is seated within the mechanical coupler, imaging devices of the portable electronic device can be employed to provide enhanced image data functions for the system. For example, a camera of the portable electronic device can be used as a system-level image capture device. Further, a display of the portable electronic device can be used as a secondary display.

In one embodiment, to provide radio-frequency management functionality, a radio-frequency interface is provided. The radio-frequency interface can be integrated into the mechanical coupler, or separated therefrom. The radio-frequency interface, in one embodiment, is configured to facilitate communication between one or more antennas disposed within the peripheral device and a radio-frequency transceiver disposed within portable electronic device. This radio-frequency interface thereby enables the radio-frequency transceiver of the portable electronic device to employ the one or more antennas disposed in the peripheral device for radio-frequency communication when the portable electronic device is disposed within the mechanical coupler. In short, the radio-frequency interface allows the radio-frequency transceiver to expand its functionality by using additional antennas disposed within the peripheral device.

As noted above, there are a multitude of applications that require two electronic devices to be coupled together to form a system. Any of this multitude of applications is well suited to take advantage of the feature management provided by the mechanical coupler's unique configuration and the radio-frequency management offered by the radio-frequency interface of embodiments of the present invention. However, to better illustrate synergistic harmonies that can arise from use of embodiments of the invention, a particular schema will be used for explanatory purposes. Specifically, in one explanatory embodiment, a portable electronic device configured in accordance with one or more embodiments of the invention includes one or more processors disposed within the device are configured for operation in a "dual-operating system hybrid environment." A first operating system environment is active during normal operation, such as when the portable device is being operated in a stand-alone mode in a user's hand. However, in certain other use cases, such as when the device is coupled to a peripheral hardware component having a dual-operating system hybrid environment license, the portable electronic device can enter a second operating system environment having enhanced performance capabilities.

In one embodiment used for illustration purposes, the dual-operating system hybrid environment is referred to as a "WebTop" environment, in that the portable electronic device has access to two simultaneous operating system environments. The first operating system environment is a standard mobile operating environment, where the portable electronic device is configured to interact with a wide area network using standard wide area network protocols and usage modes. The second operating system environment gives rise to an enhanced feature set, which can include an enhanced, full, multi-window desktop environment where the device can access a desktop class web browser and web applications similar to those normally found only on a personal computer.

In this second mode of operation, the portable electronic device can optionally also run the first operating system environment, and accordingly present one or more dedicated windows that display the content and results of operational steps in the first environment. These windows can be referred to as the "Mobile View" of the WebTop. A user can start, stop, or interact with the first environment applications inside a Mobile View window. The dual-operating system hybrid environment enables the user to access a full desktop computer web browsing experience with a mobile device, e.g., viewing the full desktop versions of Internet websites that include Adobe Flash™ based websites through the portable electronic device's built-in web browser and web application framework.

When the portable electronic device is disposed within the mechanical coupler, portions of the peripheral device may load or otherwise impede the performance of antennas disposed within the portable electronic device. The radio-frequency interface of embodiments of the present invention overcomes this issue by facilitating communication between one or more antennas disposed within the peripheral device and the radio-frequency transceiver disposed within the portable electronic device. In so doing, the radio-frequency interface enables the radio-frequency transceiver to employ the one or more antennas disposed in the peripheral electronic device for radio-frequency communication. This can enable additional features, not available with the portable electronic device alone. In other embodiments, this can increase the efficiency of radio-frequency communication by reducing loading or other antenna interference. Where the antenna of the portable electronic device is a Multiple-Input/Multiple-Output (MIMO) antenna, use of the antennas in the peripheral device can increase the overall MIMO order. Illustrating by example, if the MIMO channel order of the portable electronic device is two-by-two, and there are one or more MIMO antennas disposed within the peripheral device that offer additional network MIMO channel capabilities and that are accessible by the radio-frequency transceiver through the radio-frequency interface, the channel order can be increased to, for example, four-by-four by using these antennas in addition to those disposed within the portable electronic device.

Other feature enhancements are possible using embodiments of the invention as well. The system can also include communication capability between the peripheral device and the portable electronic device. That communication can be wired or wireless. As noted above, the radio-frequency interface then allows a radio-frequency transceiver of the portable electronic device to avail itself of one or more antennas disposed within the peripheral device. The use of the antennas allows optimization of one or more of system antenna size, MIMO order, polarization, spatial diversity, or radiation pattern diversity. An auto-detection feature can be incorporated into the radio-frequency transceiver so that it can detect the configuration of antennas disposed within the peripheral device. In other embodiments, the peripheral device may identify its internal antenna configuration via the communication mechanism.

In addition to this basic embodiment, one optional feature is to configure the mechanical coupler such that the portable electronic device extends beyond an edge of the peripheral device. Where the portable electronic device includes a camera, hanging a portion of the portable electronic device beyond an edge of the peripheral device allows the camera to be utilized as a video input for the system. Accordingly, even when the peripheral device does not include a camera, the camera of the portable electronic device can be used to create a video conferencing system. Use of the camera of the portable electronic device allows the cost of the peripheral device to be reduced as well.

In another embodiment, the display of the portable electronic device can be used as well. When coupled to the mechanical coupler, the display of the portable electronic device can be actuated to provide a "reverse-side" display for the system. Two users can therefore use the system, with one watching the primary display of the peripheral device and another watching the activated display of the portable electronic device.

As noted above, a dual mode operating environment will be used for explanatory purposes to illustrate features and advantages of embodiments of the invention. Turning now to FIG. 1, illustrated therein is one embodiment of an explanatory portable electronic device 100 configured in accordance with one or more embodiments of the invention. The illustrative portable electronic device 100 of FIG. 1 is configured for communication with a wide area network 104. The illustrative portable electronic device 100 of FIG. 1 is shown as a "smart phone" for illustration purposes. However, it will be obvious to those of ordinary skill in the art having the benefit of this disclosure that other portable electronic devices may be substituted for the explanatory smart phone of FIG. 1. For example, the portable electronic device 100 may be configured as a palm-top computer, a tablet computer, a gaming device, a media player, or other device.

The illustrative portable electronic device 100 may include standard components such a user interface 107 and associated modules. The user interface 107 can include various combinations of a display, a keypad, voice control modules, and/or touch sensitive interfaces. The portable electronic device 100 includes a radio-frequency transceiver 110. The radio-frequency transceiver 110 is configured for communication with one or more networks 104,103,120, and can include wireless communication circuitry, such as one or more receivers, transmitters, or transceivers, and one or more antennas 112.

The radio-frequency transceiver 110 can be configured for data communication with at least one wide area network 104. For illustration, the wide area network 104 of FIG. 1 is shown as a cellular network being operated by a service provider 121. Examples of cellular networks include GSM, CDMA, W-CDMA, CDMA-2000, iDEN, TDMA, and other networks. It should be understood that the radio-frequency transceiver 110 could be configured to communicate with multiple wide area networks as well, with one being shown in FIG. 1 for simplicity.

The portable electronic device 100 can optionally be configured to communicate with a local area network 103, such as the WiFi network being supported by a local area network router 113. Local area networks can be connected through communication nodes, e.g., local area network router 113, to other networks, such as the Internet, which is represented by network 120 in FIG. 1. For example, the local area network 103 can provide data communication through a non-IP Multimedia Subsystem (non-IMS) channel.

The portable electronic device 100 includes one or more processors 102, which are responsible for performing the functions of the device. The one or more processors 102 can be a microprocessor, a group of processing components, one or more Application Specific Integrated Circuits (ASICs), programmable logic, or other type of processing device. The one or more processors 102 are operable with the user interface 107 and the radio-frequency transceiver 110, as well as various peripheral ports 105 that can be coupled to peripheral hardware devices 106 via interface connections for communication with those peripheral hardware devices 106. The one or more processors 102 process and execute executable software code to perform the various functions of the portable electronic device 100.

A storage device 124, such as a memory module, stores the executable software code used by the one or more processors 102 for device operation. The storage device 124 may also store identification information suitable for identifying the portable electronic device 100 or its user to the service provider 121. In one embodiment, the identification information includes information identifying the user and the type of subscription held by the user for wireless communication services.

The one or more processors 102, in one embodiment, can be configured to host a dual-operating system hybrid environment 111. A first operating system environment 114 can be configured for data communication 115 with the wide area network 104. This data communication 115 is referred to as "mobile communication" and can be used for voice calls, mobile device web browsing, text and multimedia messages, and so forth.

The second operating system environment 116 is operable to communicate with the wide area network 104, and can optionally use enhanced data rate communication 117. One example of the second operating system environment 116 is the WebTop environment discussed above, in which enhanced, full, multi-window desktop environments can be used, where the portable electronic device 100 can access a desktop class web browser and web applications, which are similar to those normally found only on a personal computer.

In one embodiment a peripheral electronic device 106 can be configured with a mechanical coupler 136. The mechanical coupler 136 is configured to receive the portable electronic device 100 so that the portable electronic device 100 and the peripheral electronic device 106 can be connected together.

The mechanical coupler 136, in one embodiment, includes an exterior surface 135. The mechanical coupler 136 can be configured to receive the portable electronic device 100 such that a major face 134 of the portable electronic device 100 abuts the exterior surface 135. Additionally, the mechanical coupler 136 can include a radio-frequency interface 108 that couples to a radio-frequency port 133 of the portable electronic device 100. The radio-frequency interface 108 can include a radio-frequency port 137 that is complementary to the radio-frequency port 133 of the portable electronic device 100, such that the radio-frequency port 133 can couple to the complementary radio-frequency port 137 at a connection point. Where the peripheral electronic device 106 comprises one or more antennas 138, the radio-frequency interface 108 can be configured to facilitate communication between the one or more antennas 138 and the radio-frequency transceiver 110. This enables the radio-frequency transceiver 110 to employ the one or more antennas 138 disposed in the portable electronic device 100 for radio-frequency communication when the portable electronic device 100 is disposed within the peripheral electronic device 106.

In one or more embodiments, the portable electronic device 100 can also include an interface 131 configured for data communication with a control circuit 132 the peripheral electronic device 106. This interface 131 can be a direct electrical connection with the peripheral electronic device 106, such as via a connector comprising electronic contacts that is configured to connect to an electrical connector 130 of the portable electronic device 100 comprising electrical contacts. Data and power can be drawn through the electrical contacts so that the portable electronic device 100 can optionally communicate with and/or be powered by a peripheral electronic device 106. Alternatively, this interface 131 can be a wireless communication channel, such as via Bluetooth.sup.™ or other near-field wireless protocol.

In one or more embodiments, when the second operating system environment 116 is launched an authentication check is performed to ensure that the subscription plan allowing operation of the second operating system environment 116. To perform the authentication, in one embodiment the one or more processors 102 initially confirm that data communication is possible between the radio-frequency transceiver 110 and the wide area network 104. This will generally be the case when the portable electronic device 100 is within range of the wide area network 104, e.g., is within the communication radius of a tower 118 of the wide area network 104, and where the radio-frequency transceiver 110 is active. Data communication would not be possible in cases where, for example, the portable electronic device was OFF, or where the portable electronic device 100 had been placed in a "airplane mode" or other mode that disables the wide area communication capabilities of the radio-frequency transceiver 110.

The one or more processors 102 then initiate the dual-operating system hybrid environment 111 by making the first operating system environment 114 and the second operating system environment 116 simultaneously operative. In many applications, the first operating system environment 114 will be continually active, while the second operating system environment 116 is selectively activated. For example, in one embodiment the second operating system environment 116 is activated when a peripheral electronic device 106 that includes a dual-operating system license key 119 is coupled to an interface connection in communication with the one or more processors 102. Examples of peripheral hardware devices 106 include external displays, docking stations, peripheral connectors, and so forth, some of which will be shown below.

Figure 2:
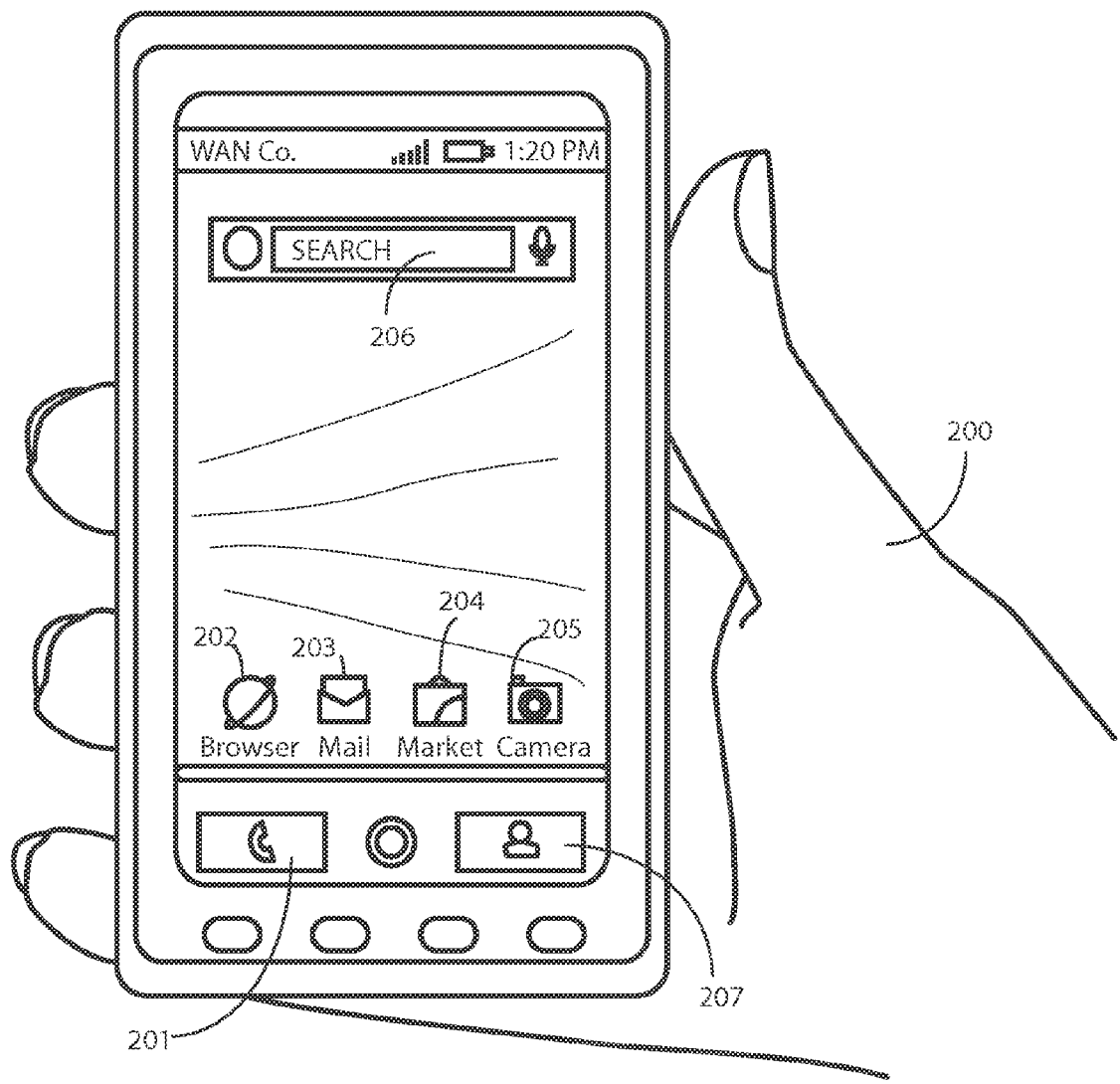
FIG. 2 illustrates one example of an operating schema for one explanatory portable electronic device configured in accordance with one or more embodiments of the invention, with this exemplary operating schema illustrating a dual-operating system environment that can require additional processing power in the portable electronic device.

Turning to FIG. 2, a user 200 is holding the portable electronic device 100 of FIG. 1. The portable electronic device is operating in the first operating system environment (114). In this illustrative example, the first operating system environment (114) is a smart cellular telephone mode. The first operating system environment (114) has associated therewith various applications. Examples of such applications include a cellular telephone application 201, a mobile web browser application 202, and a mail application 203. Other applications can include an Internet shopping application 204, a camera application 205, an Internet search application 206, and a social media application 207. These applications are illustrative only, as others will be obvious to one of ordinary skill in the art having the benefit of this disclosure.

Figure 3:
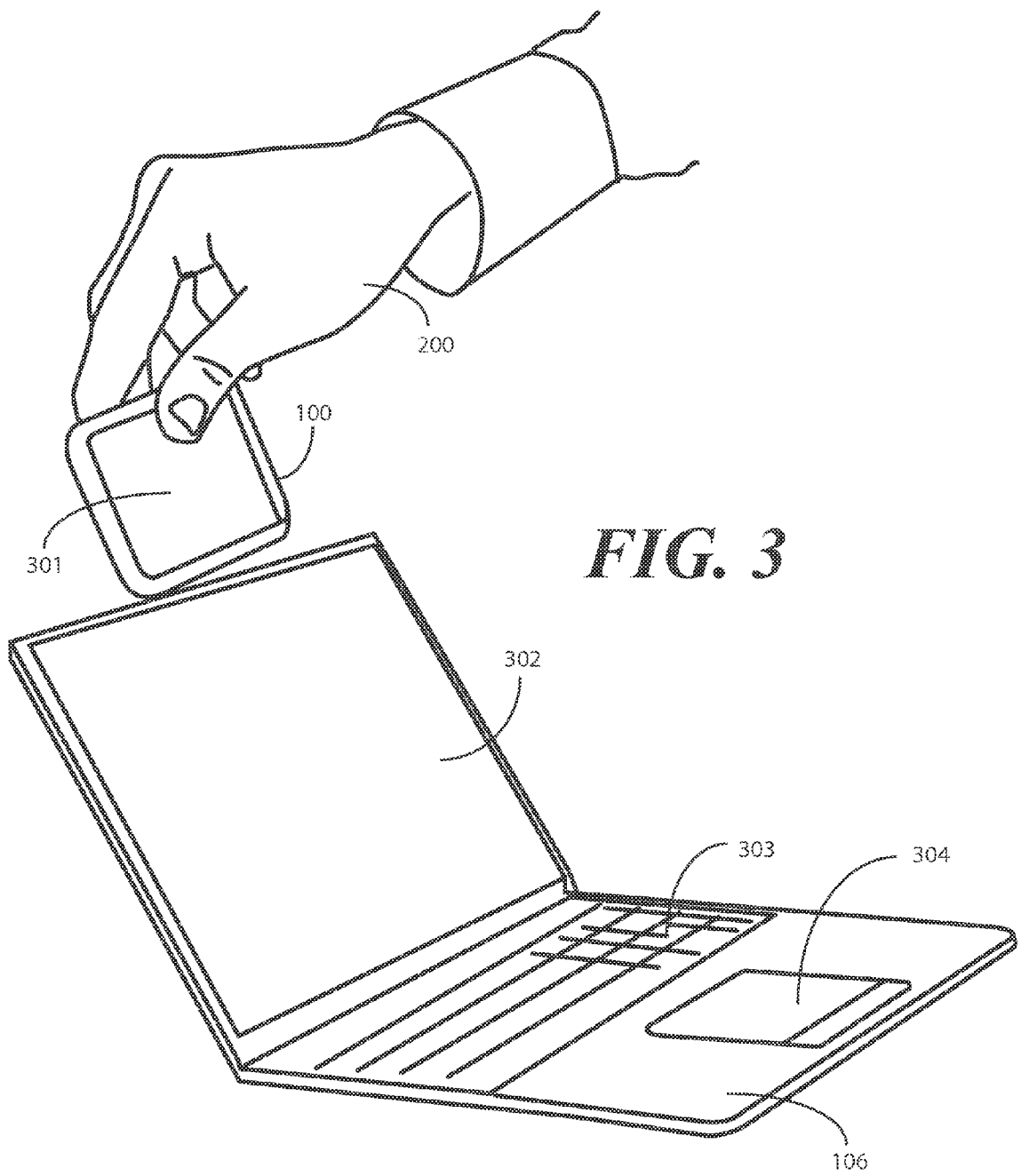
FIG. 3 illustrates a user connecting one explanatory portable electronic device configured in accordance with one or more embodiments of the invention to a peripheral device configured in accordance with one or more embodiments of the invention.
Figure 4:
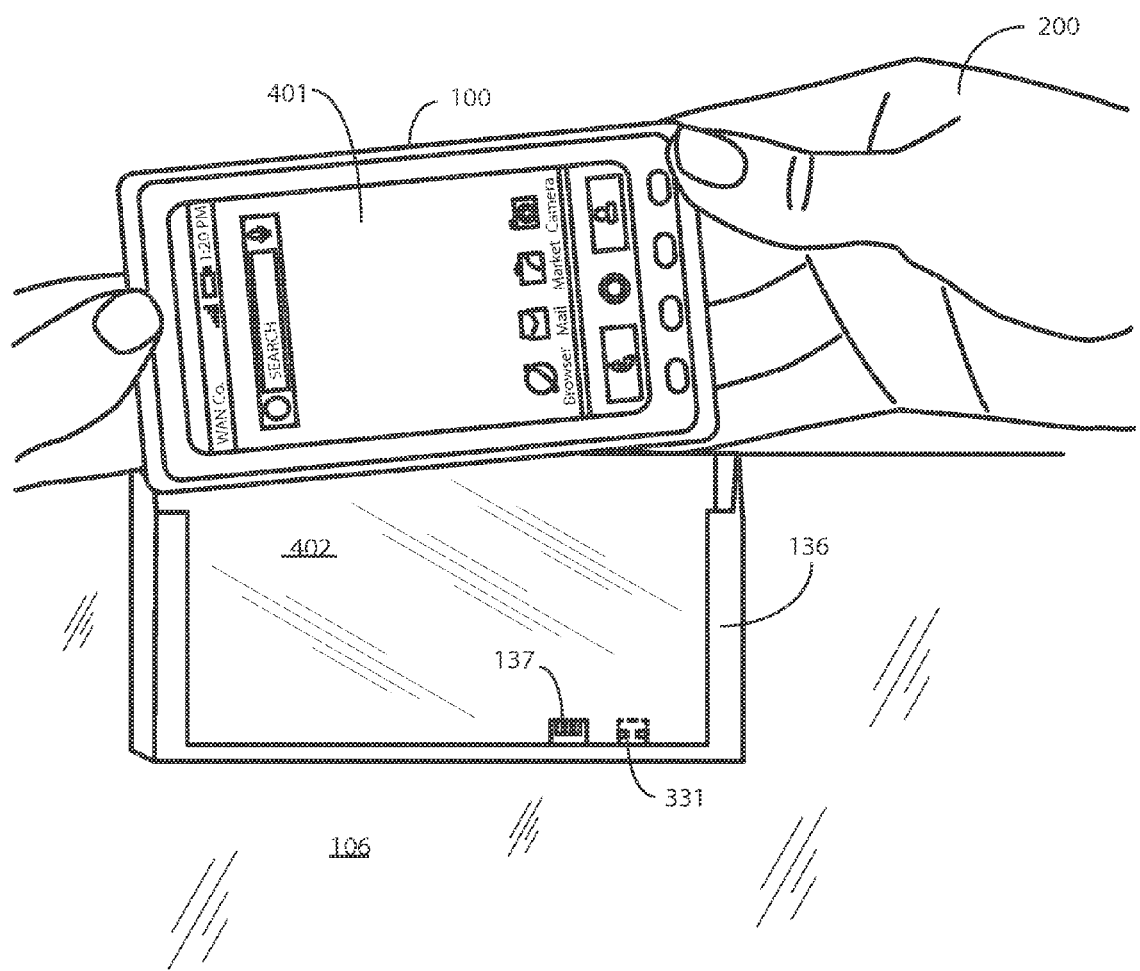
FIG. 4 illustrates a user connecting one explanatory portable electronic device configured in accordance with one or more embodiments of the invention to a mechanical coupler of a peripheral device configured in accordance with one or more embodiments of the invention.

Turning now to FIGS. 3 and 4, illustrated therein is the user 200 inserting the portable electronic device 100 into a mechanical coupler 136 of a peripheral electronic device 106 in accordance with one or more embodiments of the invention. The peripheral electronic device 106 is configured as a "lap dock" in that it resembles a laptop computer, although it could be configured as a tablet as well. The peripheral electronic device 106 is shown in perspective view in FIG. 3, and in rear elevation view in FIG. 4.

In this illustrative embodiment, the portable electronic device 100 includes a display 401 that defines a first major face disposed opposite a second major face 301 of the portable electronic device 100. When inserted into the mechanical coupler 136, the second major face 301 can be configured to abut an external surface 402 of the peripheral electronic device 106, as shown in FIG. 4. In some embodiments, the mechanical coupler 136 will instead have a rear wall against which the second major face 301 abuts. In still other embodiments, the mechanical coupler 136 will be configured such that an air gap exists between the second major face 301 and the external surface 402 of the peripheral electronic device 106.

As also shown in FIG. 4, the mechanical coupler 136 can comprise the radio-frequency interface 108, which is formed in this illustrative embodiment by providing the complementary radio-frequency port 137 that is configured to couple to a radio-frequency port (133) of the portable electronic device 100. The interface 331 configured for data communication between a control circuit of the peripheral electronic device 106 and the one or more processors (102) of the portable electronic device 100 is also shown in FIG. 4. The interface 331 is shown for illustration purposes as a physical connector. However, as noted above, the interface 331 could be wireless. In this illustrative embodiment, the complementary radio-frequency port 137 and the interface 331 are both disposed within the mechanical coupler 136. However, these connections could be disposed in other locations with cables or pigtails routing the appropriate connector to its respective port.

As shown in FIG. 3, the peripheral electronic device 106 is shown as a lap dock, which is a device having a primary display 302, a keyboard 303, and a cursor manipulation device 304. The lap dock can be configured with minimal electronic circuitry, because the one or more processors (102) of the portable electronic device 100 can be used as the central processing unit of the overall system. This allows the lap dock to be less expensive. In one embodiment, the peripheral electronic device 106 can include a dual-operating system license key (119) stored in an on-board memory device. The one or more processors (102) of the portable electronic device 100 can be configured to retrieve the dual-operating system license key (119) and then launch the second operating system environment (116). Accordingly, when inserted into the mechanical coupler 136, the portable electronic device 100 can be configured to enter the second operating system environment (116) to provide the user with a world-class desktop user experience.

Note that the mechanical coupler 136 can be configured such that the display 401 of the portable electronic device 100 will be visible when the portable electronic device 100 is seated within the mechanical coupler 136. In such a configuration, the display 401 can be activated to provide a secondary display for the overall system. Said differently, when the portable electronic device 100 is seated within the mechanical coupler, the display 401 of the portable electronic device 100 can be activated to provide a secondary display function for the system formed by the portable electronic device 100 and peripheral electronic device 106 working in tandem.

Secondary display and/or rear camera (disposed along the major face) functionality can be used for a variety of purposes. In one embodiment, the secondary display can present an advertising message. Accordingly, a service provider can offer a reduced billing plan when a user agrees to have advertising presented on the secondary display. In another embodiment, the secondary display and/or rear camera function can be used for a "dual-sided" video conferencing application where two users can sit on opposite sides of the peripheral electronic device 106, each user having a display to view.

Figure 5:
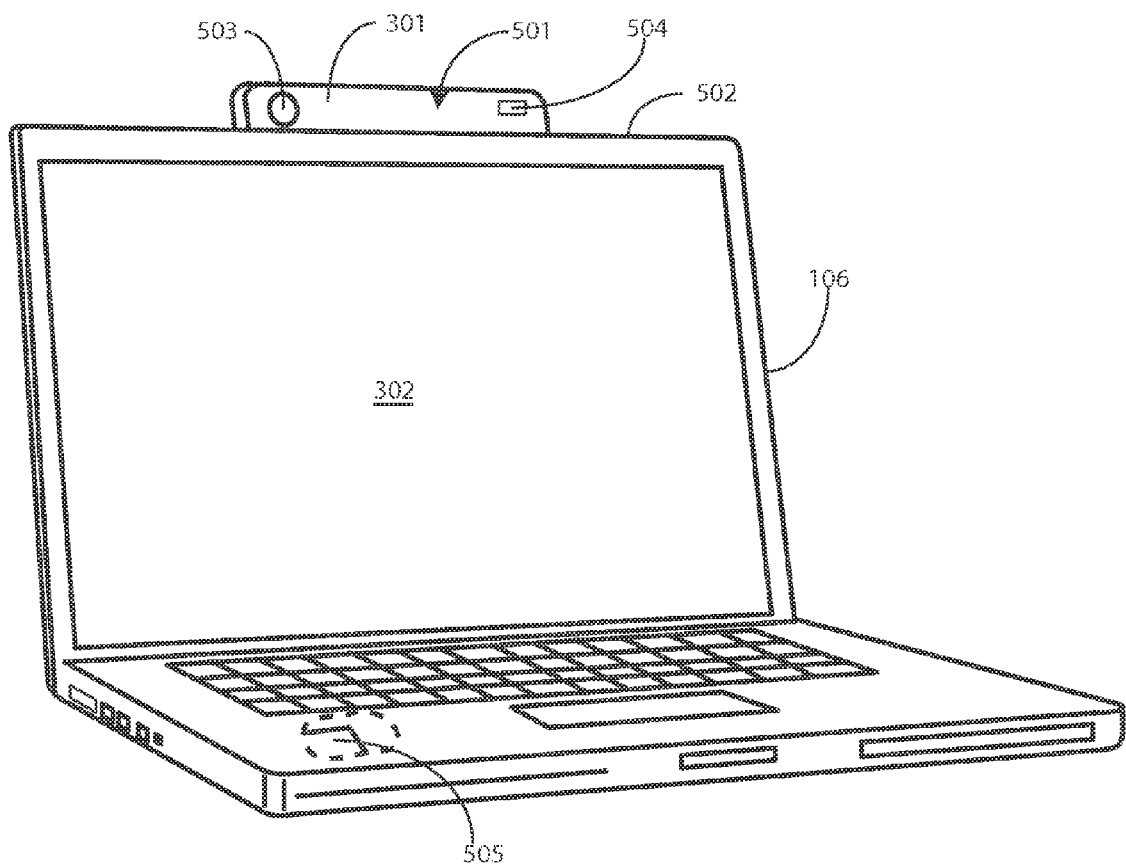
FIG. 5 illustrates one explanatory portable electronic device configured in accordance with one or more embodiments of the invention coupled to a peripheral device configured in accordance with one or more embodiments of the invention, with a camera of the explanatory portable electronic device being exposed about an edge of the peripheral device to provide video capture capabilities for the peripheral device.
Figure 6:
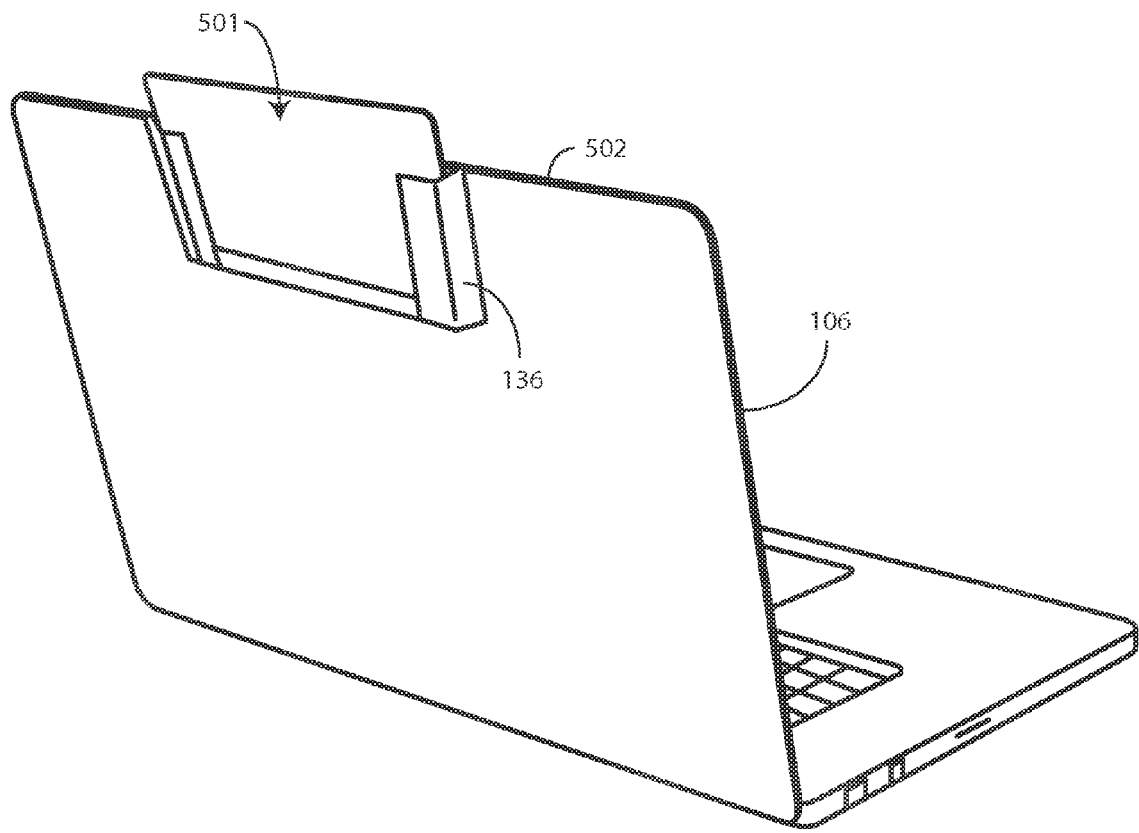
FIG. 6 illustrates one explanatory portable electronic device configured in accordance with one or more embodiments of the invention coupled to a mechanical coupler of a peripheral device configured in accordance with one or more embodiments of the invention, with the portable electronic device being exposed about an edge of the peripheral device.

As shown in FIGS. 5 and 6, in one embodiment, the mechanical coupler 136 can be configured such that when the portable electronic device 100 is inserted therein, a portion 501 of the portable electronic device 100 is exposed about an edge 502 of the peripheral electronic device 106. In this illustrative embodiment, the portable electronic device 100 includes a camera 503. The camera 503 is disposed on the major face 301 that abuts the external surface (402) of the peripheral electronic device 106. As shown in FIG. 5, the camera 503 is disposed on the portion 501 of the portable electronic device 100 that is exposed about the edge 502 of the peripheral electronic device 106. Accordingly, the camera 503 can be used as an image capture device for the system. The camera 503 can capture video images and deliver them to the display 302 of the peripheral device through the interface (131). This enables the system to work as a video conferencing unit without the need of incorporating a camera into the peripheral electronic device 106. Where the portable electronic device 100 includes a microphone and/or speaker 504, this can be disposed along the portion 501 of the major face 301 that is exposed about the edge 502 as well.

For example, when the peripheral electronic device 106 includes a control circuit 505, the one or more processors (102) of the portable electronic device 100 can be configured to communicate with the control circuit 505 via the interface (131). The one or more processors (102) can accordingly be configured to deliver video captured by the camera 503 to the control circuit 505 via the interface (131) for presentation on the display 302. Optionally, the one or more processors (102) can also deliver the video to the radio-frequency interface (108) of the peripheral electronic device 106 for transmission to a network through one or more antennas (138) disposed within the peripheral electronic device 106.

Figure 7:
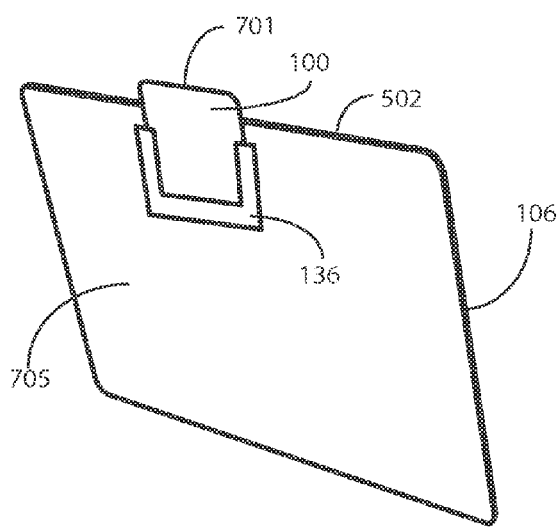
FIGS. 7-9 illustrate different explanatory locations where an explanatory portable electronic device can couple to a mechanical coupler of a peripheral device in accordance with one or more embodiments of the invention.
Figure 8:
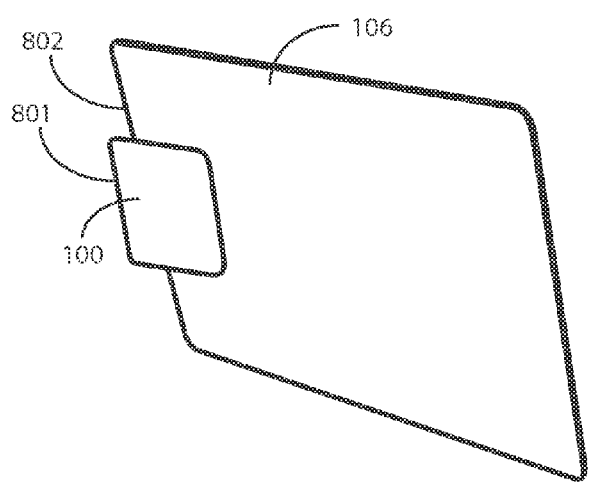
Figure 9:
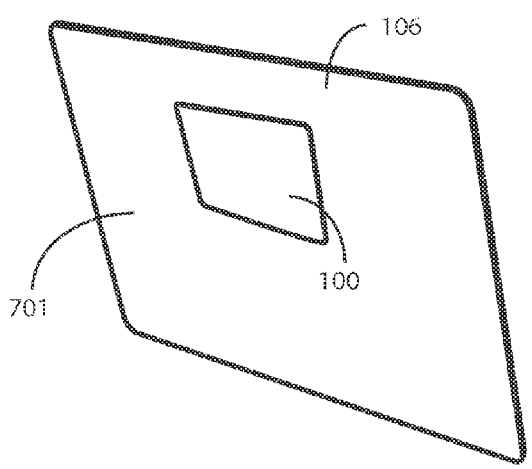

Turning now to FIGS. 7-9, illustrated therein are a few examples of locations for the mechanical coupler 136 along a rear surface 705 of a peripheral electronic device 106. It will be clear to those of ordinary skill in the art having the benefit of this disclosure that these locations are merely illustrative of any number of locations that will be readily apparent to those of ordinary skill in the art having the benefit of this disclosure.

The location shown in FIG. 7 is similar to that of FIG. 6 but with the portable electronic device 100 being oriented in a portrait orientation rather than landscape. Such an orientation can be useful when the portable electronic device 100 has communication antennas disposed at its end 701. Allowing the end 701 of the portable electronic device 100 to extend beyond the edge 502 of the peripheral electronic device 106 reduces loading on the antennas.

FIG. 8 illustrates the portable electronic device 100 extends beyond a side edge 802 of the peripheral electronic device 106. This configuration can be useful where the portable electronic device 100 includes antennas, camera devices, microphones, or speakers disposed along a side edge 801 of the portable electronic device 100.

FIG. 9 illustrates the portable electronic device 100 being located along a central portion of the rear side 701 of the peripheral electronic device. While any of the embodiments of FIGS. 7-9 could cause loading of antennas disposed within the portable electronic device 100, the embodiment of FIG. 9 can be particularly loading due to the fact that the rear side 701 of the peripheral electronic device 106 extends across the major face (301) of the portable electronic device 100 and in all directions therefrom. This means that the ground plane of any printed circuit board disposed within the peripheral electronic device 106 can load the antennas disposed within the portable electronic device 100.

Embodiments of the present invention provide solutions to this loading by, in some embodiments, equipping the peripheral electronic device 106 with internally disposed antennas. When the antennas of the portable electronic device 100 become loaded, the one or more processors (102) of the portable electronic device can use the lesser-loaded antennas of the peripheral electronic device 106 for communication by causing the radio-frequency transceiver (110) to communicate with the antennas through the radio-frequency interface (108). This will be shown in more detail below.

Figure 10:
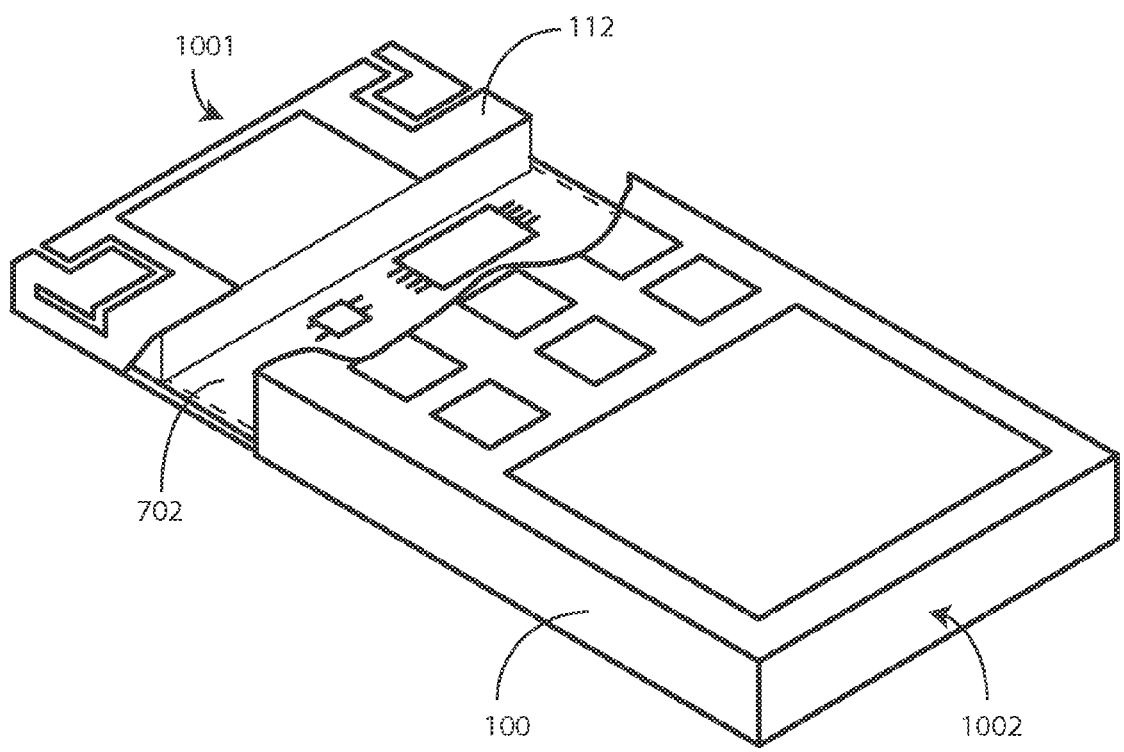
FIG. 10 illustrates a cutaway view of one explanatory portable electronic device configured in accordance with one or more embodiments of the invention.

Turning first to FIG. 10, illustrated therein is a cut-away view of the portable electronic device 100. The portable electronic device 100 can comprises one or more antennas 112, which can be used for radio-frequency communication with a network (104). In this illustrative embodiment, the exposed antenna 112 is disposed at a first end 1001 of the portable electronic device 100. The explanatory antenna 112 of FIG. 10 comprises a multi-band folded inverted conformal antenna element. The antenna 112 is coupled to the printed circuit board 702 of the portable electronic device 100. The antenna 112 is manufactured, in one embodiment, from an electrically conductive material such as copper or phosphorous bronze. The antenna 112 and a ground plane of the printed circuit board 702 form the overall antenna structure. The antenna 112, working in combination with the ground plane of the printed circuit board 702, is capable of serving as a multi-mode antenna. The multi-modes can include a first operational bandwidth, second operational bandwidth, and third operational bandwidth by operating in common modes or differential modes.

In one or more embodiments, the antenna 112 comprises a MIMO antenna. Further, while one antenna 112 is shown in FIG. 10, the portable electronic device 100 can include multiple antennas. For example, a second multi-band folded inverted conformal antenna element could be disposed at a distal end of the portable electronic device 100 from antenna 112. Alternatively, an antenna element could be placed in each of the four corners—or along the four sides—of the portable electronic device for a four-antenna array.

The antennas of the portable electronic device can be configured for different functions. For example, a first antenna can be configured for WAN configuration with a cellular network. Examples of such networks include GSM, CDMA, W-CDMA, CDMA-2000, iDEN, and other networks. A second antenna can be configured to operate as a Global Positioning System (GPS) receiver. A third antenna can be configured for WLAN communication, such as through Bluetooth.sup.™ or WiFi networks based upon the IEEE 802.11 and other standards. A fourth antenna may be a diversity antenna. Other types of antennas will be obvious to those of ordinary skill in the art having the benefit of this disclosure.

Figure 11:
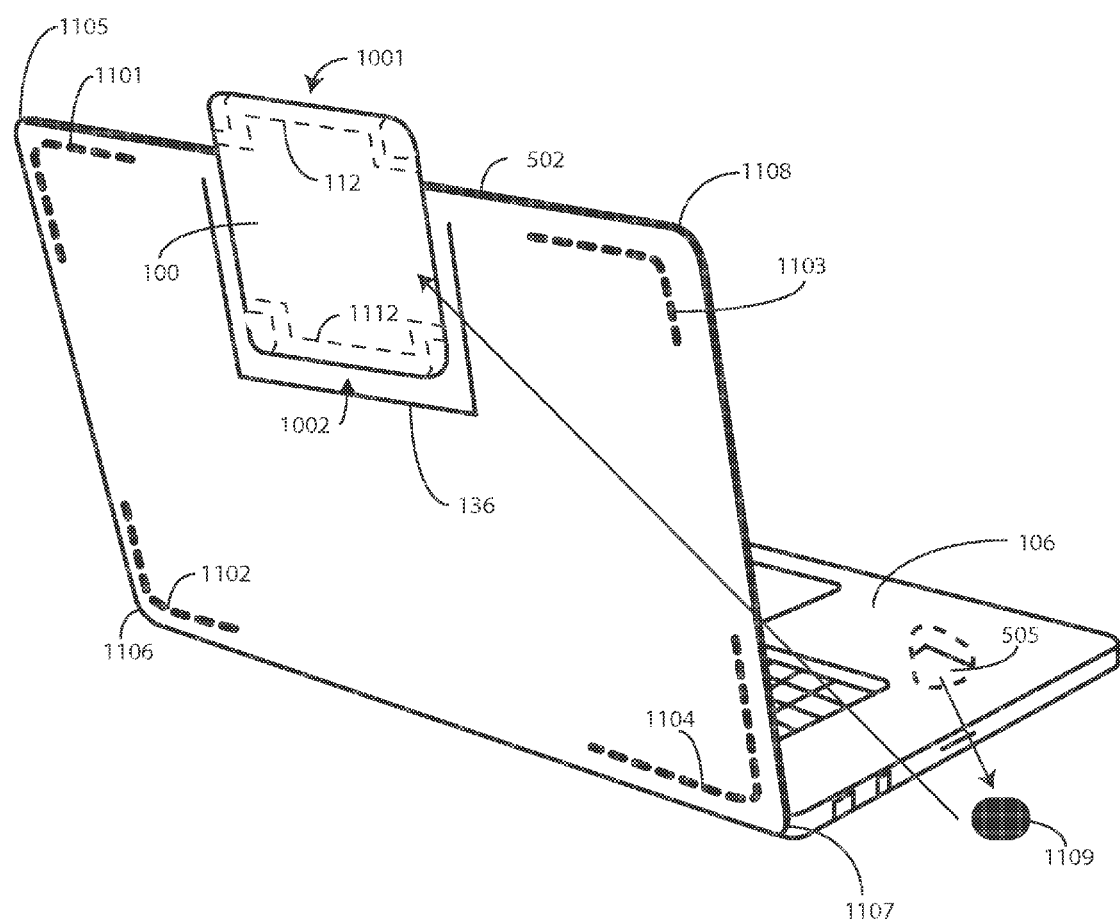
FIGS. 11-12 illustrate explanatory radio frequency management schemata between a portable electronic device and a peripheral device in accordance with one or more embodiments of the invention.

Turning now to FIG. 11, the mechanical coupler 136 is configured such that when the portable electronic device 100 is seated therein, the first end 1001 of the portable electronic device extends beyond an edge 502 of the peripheral electronic device 106. Accordingly, the antenna 112 disposed at the first end 1001 is exposed beyond the edge 502 of the peripheral electronic device 106. This results in little or no loading of the antenna 112. Accordingly, it can continue to operate normally.

By contrast, an antenna 1112 disposed at the distal end 1002 is adjacent to a ground plane of a printed circuit board disposed within the peripheral electronic device 106. This results in antenna 1112 being loaded due to the strong electromagnetic coupling occurring between the antenna 1112 and components of the peripheral electronic device 106. To provide more efficient communication capability for the overall system, in one embodiment the peripheral electronic device 106 is equipped with one or more antennas.

In this illustrative embodiment, the peripheral electronic device 106 is equipped with four antennas 1101,1102,1103, 1104, each being disposed at a corner 1105,1106,1107,1108 of the peripheral electronic device 106. Note that the use of four antennas 1101,1102,1103,1104, as well as the corner locations at which they are disposed within the peripheral electronic device 106, are illustrative only. Other numbers of antennas can be used and their location can be varied. For example, while the peripheral electronic device 106 of FIG. 10 is equipped as a lap dock, if it were configured as a tablet or other shaped device the number and location of the antennas may change.

In this illustrative embodiment, antenna 1101 is configured as a WLAN antenna, such as one configured to communicate with a cellular network (104). Antenna 1102 is configured as a cellular network antenna, which could be a Wifi or Bluetooth.sup.™ antenna. Antenna 1103 is configured as a GPS receiver antenna, while antenna 1104 is configured as an auxiliary diversity or MIMO antenna.

In this illustrative embodiment, antenna 112 is configured as a GPS receiver antenna. Since it is exposed beyond the edge 502 of the peripheral electronic device, it can remain active and operable within the portable electronic device. As noted above, antenna 1112 is configured as a cellular antenna. Since it is loaded, communication with a cellular network (104) will be impaired. Additionally, any antennas disposed on the sides of the portable electronic device 100 will be loaded and impaired as well.

To overcome this issue, within the peripheral electronic device 106, the first antenna 1101 is configured as an auxiliary cellular antenna. The radio-frequency transceiver (110) of the portable electronic device 100 can employ the radio-frequency interface (108) to use the first antenna 1101 for cellular communication with a cellular network (104). Said differently, the radio-frequency transceiver (110) of the portable electronic device (100) can be operable to send and transmit data with the antennas 1101,1102,1103,1104 disposed within the peripheral electronic device 106 instead of its internally disposed antennas, e.g., antenna 1112, when the portable electronic device 100 is disposed within the mechanical coupler 136. In this illustrative use case, the radio-frequency transceiver (110) employs the radio-frequency interface (108) to conduct cellular communications with a cellular network. Similarly, if a WLAN antenna disposed within the portable electronic device were also loaded by the peripheral electronic device 106, the radio-frequency transceiver (110) could instead use antenna 1102 for WLAN communication when the portable electronic device was disposed within the mechanical coupler 136. Since the GPS antenna of the portable electronic device 100 is still operative, the radio-frequency transceiver (110) of the portable electronic device 100 is operable to send and transmit some data, i.e., the cellular data, with the one or more antennas of the peripheral electronic device 106 instead of the at least one of one or more internally disposed antennas that is loaded, i.e., antenna 1112, and send and transmit at least some other data, i.e., GPS data, with unloaded antennas, i.e., antenna 112, of the one or more internally disposed antennas, when the portable electronic device 100 is disposed within the mechanical coupler 136.

As will be evident to those of ordinary skill in the art having the benefit of this disclosure, the type and configuration of antennas disposed within the peripheral electronic device 106 can vary. Accordingly, the one or more processors (102) of the portable electronic device 100, the radio-frequency transceiver (110) of the portable electronic device 100, or combinations thereof, must be apprised of this configuration to effectively take advantage of the same. This can be accomplished in a number of ways.

In a first embodiment, the radio-frequency transceiver (110) can determine the antenna configuration of the peripheral electronic device by trial and error. It can deliver test radio-frequency signals to the radio-frequency interface (108) and then a receiver signal strength indicator can determine one or more parameters measuring transmission mismatch, such as VWSR. Where communication through a particular antenna provides a sufficient quality of service, the one or more processors (102) of the portable electronic device 100 can conclude that the antenna being used is adequate for the current purpose. Where this is not the case, a different communication signal can be delivered. In this trial and error approach, the portable electronic device 100 can surmise which of the four antennas 1101,1102,1103, 1104 can be used for WLAN communication and which for cellular network, and so forth.

In another embodiment, the control circuit 505 of the peripheral electronic device 106 can be equipped with an identifier 1109 that can be transferred to the one or more processors (102) of the portable electronic device through the interface (131). The identifier 1109 can be a serial number, a multi-part digital word, or more specific information. For example, in one embodiment, the identifier 1109 can be a serial number, which represents a predetermined configuration of the peripheral electronic device 106. The one or more processors (102) can determine the configuration by cross-referencing a look-up table to determine how the antennas of the peripheral electronic device 106 are configured. The one or more processors (102) can then be configured to reconfigure usage of the one or more internally disposed antennas based upon the identifier. In another embodiment, the identifier 1109 can be a data element that includes a description of the antenna configuration and/or configuration information about the antennas of the peripheral electronic device 106. Other identification methods will be obvious to those of ordinary skill in the art having the benefit of this disclosure.

Figure 12:
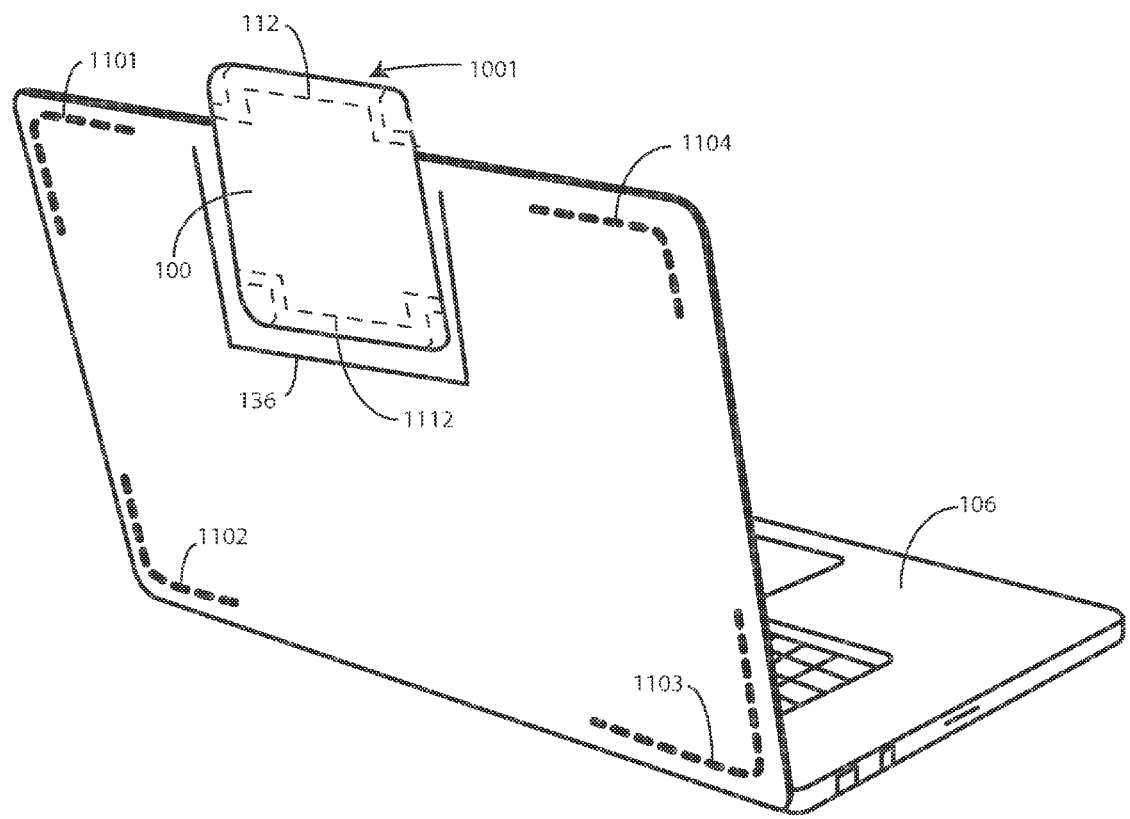

Turning now to FIG. 12, illustrated therein is yet another unique feature of the invention. As shown in FIG. 12, the portable electronic device 100 is inserted into a mechanical coupler 136 with a first end 1001 of the portable electronic device 100 extending beyond an edge 502 of the peripheral electronic device 106. This leaves antenna 112 unloaded, thereby allowing it to remain operable.

In this embodiment, the antennas 112,1112 of the portable electronic device 100 are configured as MIMO antennas. MIMO antennas are well suited for embodiments of the present invention because they offer increased data throughput and link range without additional bandwidth. MIMO antennas spread transmit power over multiple antenna elements to achieve a gain array that improves transmission efficiency or link reliability. MIMO antennas operating in a spatial multiplexing context, transmitting independent and separately encoded data signals. These data signals, referred to as "streams," transmit from each of the multiple transmit antennas. This spatial multiplexing results in reduced dimensions for the antennas. MIMO antennas are routinely used in communication standards, including IEEE 802.11n, 4G, 3GPP Long Term Evolution, WiMAX and HSPA+.

As is known in the art, MIMO antennas are characterized by a matrix channel having a matrix channel order. A radio-frequency transceiver sends information across multiple transmit antenna elements. The transmitted data thus passes across a matrix channel defined by the paths from the various transmit antennas and receive antennas of the network element receiving the communication. The matrix is a function of the matrix channel order, which is defined by the number of transmit and receive antennas.

In one or more embodiments, at least some of the antennas 1101,1102,1103,1104 of the peripheral electronic device 106 are also configured as MIMO antennas. In this illustrative embodiment, each of the antennas 1101,1102,1103,1104 is configured as a MIMO antenna. The antennas 1101,1102, 1103,1104 therefore form a MIMO array. Consequently, when the portable electronic device 100 is disposed within the mechanical coupler 136, the radio-frequency interface (108) of the mechanical coupler 136 is configured to increase the matrix channel order by making the at least some of the one or more antennas disposed in the peripheral electronic device 106 available for the matrix channel. Said differently, the radio-frequency interface (108) makes the MIMO antennas accessible to the radio-frequency transceiver (110) so that the order can be increased. For example, if the radio-frequency transceiver (110) uses all four antennas 1101,1102,1103,1104 of the peripheral electronic device 106, the matrix order can be increased by a factor of four over the order provided by the antennas 112,1112 of the portable electronic device 100 operating in a stand-alone mode.

As described above, an electronic device can include mechanical coupler. The mechanical coupler can be configured to receive another electronic device, like a portable electronic device, such that a major face of the electronic device abuts an external surface of the peripheral device. In one embodiment, the electronic device can comprise one or more antennas. In one embodiment, the antennas are MIMO antennas. A radio-frequency interface of the mechanical coupler can be configured to facilitate communication between the one or more antennas and a radio-frequency transceiver disposed within the electronic device disposed within the mechanical coupler This communication enables the radio-frequency transceiver to employ the one or more antennas disposed in the electronic device for radio-frequency communication when the electronic device is disposed within the mechanical coupler. Where the antennas are MIMO antennas, this communication can be used to increase a matrix channel order of the electronic device by making the at least some of the one or more additional MIMO antennas available for usage by the radio-frequency transceiver when the electronic device is disposed within the mechanical coupler.

The mechanical coupler or other coupler can be configured such that a portion of an electronic device disposed therein extends beyond an edge of the peripheral electronic device. Where the electronic device includes a camera, the camera can provide video capture functionality for the overall system. Additionally, a display of the electronic device can be actuated when the electronic device is disposed within the coupler to provide secondary display functionality.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A first electronic device, comprising:
    a mechanical coupler configured to receive another electronic device having one or more internally disposed antennas;
    an interface configured for data communication with the another electronic device when disposed within the mechanical coupler;
    one or more MIMO antennas configured in an array;
    a radio-frequency interface configured to facilitate communication between the one or more MIMO antennas and a radio-frequency transceiver disposed within the another electronic device that enables the radio-frequency transceiver to employ the one or more MIMO antennas disposed in the first electronic device for radio frequency communication to increase a MIMO matrix channel order of the another electronic device when the another electronic device is disposed within the mechanical coupler; and
    an identifier comprising configuration information about the one or more MIMO antennas, the configuration information being configured for use by the another electronic device to configure use of the one or more internally disposed antennas of the another electronic device.

2. The first electronic device of claim 1, wherein the interface is wireless.

3. The first electronic device of claim 1, wherein the radio-frequency interface comprises a radio-frequency port configured to couple to a complementary radio-frequency port of the another electronic device.

4. The first electronic device of claim 1, further comprising the another electronic device.

5. The first electronic device of claim 4, wherein the first electronic device comprises a display.

6. The first electronic device of claim 5, wherein the first electronic device comprises a display portion having the display on one side and an exterior surface on an opposite side facing away from the display; the mechanical coupler is disposed on the exterior surface of the display portion in a fixed position relative to the display; and is configured such that a major face of the another electronic device abuts the exterior surface when the another electronic device is disposed within the mechanical coupler.

7. The first electronic device of claim 6, wherein the another electronic device comprises another display disposed on a side of the another electronic device opposite the major face, wherein the another display is configured to be operable when the another electronic device is disposed within the mechanical coupler to provide a secondary display function.

8. The first electronic device of claim 4, wherein: the another electronic device comprises camera disposed along a major face; and the mechanical coupler is configured such that when the another electronic device is disposed therein the camera is exposed about an edge of the first electronic device.

9. The first electronic device of claim 8, wherein: the another electronic device comprises one or more processors; and the one or more processors are operable to deliver image data captured by the camera to one or more of the interface or the radio-frequency interface when the another electronic device is disposed within the mechanical coupler.

10. The first electronic device of claim 4, wherein: the radio-frequency transceiver of the another electronic device is operable to send and transmit data with the one or more MIMO antennas instead of the one or more internally disposed antennas when the another electronic device is disposed within the mechanical coupler.

11. The first electronic device of claim 4, wherein: the another electronic device comprises a plurality of internally disposed antennas; at least one of the plurality of internally disposed antennas becomes loaded when the another electronic device is disposed within the mechanical coupler; and the radio-frequency transceiver of the another electronic device is operable to send and transmit some data with the one or more MIMO antennas instead of the at least one of the plurality of internally disposed antennas that is loaded, and send and transmit at least some other data with unloaded antennas of the plurality of internally disposed antennas, when the another electronic device is disposed within the mechanical coupler.

12. The first electronic device of claim 4, wherein: the another electronic device comprises a control circuit; and the control circuit is configured to read the identifier from the interface.

13. An electronic system, comprising:
    a first electronic device comprising a radio-frequency transceiver operable with one or more MIMO antennas internally disposed within the first electronic device; and
    a second electronic device comprising a coupler configured to receive the first electronic device, a radio-frequency interface operable with one or more additional MIMO antennas disposed within the second electronic device, and an identifier comprising configuration information about the one or more additional MIMO antennas, the configuration information being configured for use by the first electronic device to configure use of the one or more MIMO antennas disposed within the first electronic device;
    wherein the radio-frequency interface is configured to increase a matrix channel order of the first electronic device by making at least one of the one or more additional MIMO antennas available for usage by the radio-frequency transceiver when the first electronic device is disposed within the coupler.

14. The electronic system of claim 13, wherein: the first electronic device comprises a camera disposed along a major face of the first electronic device; and the coupler is configured such that the camera is exposed about an edge of the second electronic device when the first electronic device is disposed within the coupler.

15. The electronic system of claim 13, wherein: the first electronic device comprises a display; and the coupler is configured such that the display is visible when the first electronic device is disposed within the coupler.

16. The electronic system of claim 13, wherein the second electronic device comprises a display portion having a display on one side and an exterior surface on an opposite side facing away from the display; the coupler is disposed on the exterior surface of the display portion in a fixed position relative to the display.

* * * * *